US009625725B2

(12) United States Patent
Ishikawa et al.

(10) Patent No.: US 9,625,725 B2
(45) Date of Patent: Apr. 18, 2017

(54) WEARABLE COMPUTER

(71) Applicant: KONICA MINOLTA, INC., Chiyoda-ku (JP)

(72) Inventors: Tetsuya Ishikawa, Hachioji (JP); Naoki Tajima, Hachioji (JP); Kazuhiko Iwaki, Ryugasaki (JP); Satoru Hirose, Tondabayashi (JP)

(73) Assignee: KONICA MINOLTA, INC., Tokyo (JP)

( * ) Notice: Subject to any disclaimer, the term of this patent is extended or adjusted under 35 U.S.C. 154(b) by 39 days.

(21) Appl. No.: 14/771,699

(22) PCT Filed: Mar. 3, 2014

(86) PCT No.: PCT/JP2014/055291
§ 371 (c)(1),
(2) Date: Aug. 31, 2015

(87) PCT Pub. No.: WO2014/141918
PCT Pub. Date: Sep. 18, 2014

(65) Prior Publication Data
US 2016/0004084 A1 Jan. 7, 2016

(30) Foreign Application Priority Data
Mar. 11, 2013 (JP) ................................. 2013-048003

(51) Int. Cl.
*G02B 27/01* (2006.01)
*G02B 17/08* (2006.01)
(Continued)

(52) U.S. Cl.
CPC ......... *G02B 27/0176* (2013.01); *G02B 17/08* (2013.01); *G02B 25/02* (2013.01);
(Continued)

(58) Field of Classification Search
CPC .. G02B 27/01; G02B 27/017; G02B 27/0172; G02B 27/0176; G02B 2027/014;
(Continued)

(56) References Cited

U.S. PATENT DOCUMENTS 5,153,569 A * 10/1992 Kawamura .......... G02B 27/017
345/8
5,594,573 A * 1/1997 August ................ G02B 27/017
349/13
(Continued)

FOREIGN PATENT DOCUMENTS

JP 9-503594 4/1997
JP 11-327750 11/1999
(Continued)

*Primary Examiner* — Michael J Eurice
(74) *Attorney, Agent, or Firm* — Cozen O'Connor

(57) ABSTRACT

A wearable computer includes a computer, a display unit, first and second casings, temples, a holding member and an adjustment mechanism. The second casing houses the computer. The temples are respectively connected to one end and, through a connection member, the other end of the first casing in a longitudinal direction. The holding member extends downward from the connection member and holds a nose pad and a translucent member. The display unit extends downward from the first casing and to outside of an installation space of the translucent member to face one eye of a wearer. The adjustment mechanism adjusts a relative position of the display unit and the nose pad. The wearable computer is wearable with the first casing being held above the one eye by the temples, the connection member and the nose pad.

19 Claims, 9 Drawing Sheets

(51) Int. Cl.
  *G02B 25/02* (2006.01)
  *G02B 27/02* (2006.01)
  *G02C 11/00* (2006.01)
  *G06F 1/16* (2006.01)

(52) U.S. Cl.
  CPC .......... *G02B 27/01* (2013.01); *G02B 27/017* (2013.01); *G02B 27/0172* (2013.01); *G02B 27/02* (2013.01); *G02C 11/10* (2013.01); *G06F 1/163* (2013.01); *G02B 2027/014* (2013.01); *G02B 2027/015* (2013.01); *G02B 2027/0132* (2013.01); *G02B 2027/0152* (2013.01); *G02B 2027/0158* (2013.01); *G02B 2027/0161* (2013.01); *G02B 2027/0178* (2013.01)

(58) Field of Classification Search
  CPC ...... G02B 2027/015; G02B 2027/0161; G02B 2027/0174; G02B 2027/0178; G02C 11/10; G06F 1/163
  See application file for complete search history.

(56) References Cited

U.S. PATENT DOCUMENTS

| | | | | |
|---|---|---|---|---|
| 5,708,449 A * | 1/1998 | Heacock | G02B 23/10 | 345/7 |
| 6,005,536 A * | 12/1999 | Beadles | G02B 27/017 | 345/7 |
| 6,081,304 A * | 6/2000 | Kuriyama | G02B 27/017 | 345/8 |
| 7,513,674 B1 * | 4/2009 | Donahue | G02B 6/0055 | 362/103 |
| 8,184,070 B1 * | 5/2012 | Taubman | G06F 3/012 | 345/7 |
| 8,189,263 B1 * | 5/2012 | Wang | G02B 27/0172 | 359/630 |
| 8,384,999 B1 * | 2/2013 | Crosby | G02B 27/0172 | 349/11 |
| 8,743,464 B1 * | 6/2014 | Amirparviz | G02B 27/01 | 359/633 |
| 8,913,865 B1 * | 12/2014 | Bennett | G02B 6/10 | 385/129 |
| 2002/0005819 A1 * | 1/2002 | Ronzani | G02B 27/017 | 345/8 |
| 2002/0140899 A1 * | 10/2002 | Blum | G02B 27/017 | 351/159.03 |
| 2002/0171940 A1 * | 11/2002 | He | G02B 27/01 | 359/630 |
| 2003/0231293 A1 * | 12/2003 | Blum | G02B 27/017 | 356/5.01 |
| 2004/0169618 A1 * | 9/2004 | Nakai | G02F 1/1362 | 345/1.1 |
| 2005/0253773 A1 * | 11/2005 | Sekiguchi | G06F 3/1423 | 345/1.1 |
| 2006/0023158 A1 * | 2/2006 | Howell | G02C 11/10 | 351/41 |
| 2006/0034478 A1 * | 2/2006 | Davenport | G02C 11/10 | 381/381 |
| 2007/0030442 A1 * | 2/2007 | Howell | G02C 11/10 | 351/158 |
| 2008/0013041 A1 * | 1/2008 | Chou | G02C 11/06 | 351/158 |
| 2008/0094586 A1 * | 4/2008 | Hirayama | G02B 6/0018 | 353/98 |
| 2009/0161225 A1 * | 6/2009 | Liu | G02B 25/004 | 359/643 |
| 2010/0165287 A1 * | 7/2010 | Pienimaa | G02B 27/0172 | 351/158 |
| 2010/0245756 A1 * | 9/2010 | Sugihara | G02B 27/0172 | 351/158 |
| 2010/0321409 A1 * | 12/2010 | Komori | G02B 27/017 | 345/656 |
| 2010/0321781 A1 * | 12/2010 | Levola | G02B 27/0081 | 359/569 |
| 2011/0073773 A1 * | 3/2011 | Labrot | B32B 17/10 | 250/461.1 |
| 2012/0068913 A1 * | 3/2012 | Bar-Zeev | G02B 26/026 | 345/8 |
| 2012/0075168 A1 * | 3/2012 | Osterhout | G02B 27/017 | 345/8 |
| 2012/0120499 A1 * | 5/2012 | Harrison | G02B 17/06 | 359/631 |
| 2012/0218301 A1 * | 8/2012 | Miller | G02B 27/017 | 345/633 |
| 2013/0002545 A1 * | 1/2013 | Heinrich | G06F 3/0485 | 345/157 |
| 2013/0002724 A1 * | 1/2013 | Heinrich | G06F 1/163 | 345/676 |
| 2013/0044043 A1 * | 2/2013 | Abdollahi | A42B 3/0433 | 345/8 |
| 2013/0107371 A1 * | 5/2013 | DeVaul | G02B 3/0006 | 359/630 |
| 2013/0114043 A1 * | 5/2013 | Balan | H04N 13/044 | 351/210 |
| 2013/0342914 A1 * | 12/2013 | Mukawa | G02B 27/0176 | 359/630 |
| 2014/0139927 A1 * | 5/2014 | Hiraide | G02B 27/0172 | 359/630 |
| 2015/0103003 A1 * | 4/2015 | Kerr | G06F 3/013 | 345/158 |
| 2015/0109797 A1 * | 4/2015 | Jurik | F21V 11/18 | 362/321 |

FOREIGN PATENT DOCUMENTS

| | | |
|---|---|---|
| JP | 2005-284023 | 10/2005 |
| JP | 2011-2753 | 1/2011 |
| JP | 2011-158678 | 8/2011 |
| JP | 2013-46177 | 3/2013 |

* cited by examiner

WEARABLE COMPUTER

RELATED APPLICATIONS

This is a U.S. National Phase Application under 35 USC 371 of International Application PCT/JP2014/055291 filed on Mar. 3, 2014.

This application claims the priority of Japanese application no. 2013-048003 filed Mar. 11, 2013, the entire content of which is hereby incorporated by reference.

TECHNICAL FIELD

The present invention relates to a wearable computer worn like eyeglasses.

BACKGROUND ART

As described in Patent Documents 1 and 2, there has been proposed a head-mounted display provided with a transmissive display and worn like eyeglasses. This type of head-mounted display can be worn like eyeglasses with nose pads and temples. When it is thus worn, a display unit of the transmissive display is disposed in front of the eyes of a wearer. This display unit is a transmissive (see-through) display which displays video images and also transmits light from the outside, so that the wearer can visually recognize both the video images displayed on the display unit and the outside world.

In the one described in Patent Document 1, image forming devices (110 in the document) are disposed on the sides of the eyes so as to extend downward from a front part (10B in the document) of a frame, and display units (light guiding units 120 in the document) are provided to extend sideward from the image forming devices so as to be disposed in front of the eyes.

The one described in Patent Document 2 has spectacle lenses (lens parts 3a and 3b in the document) facing the respective eyes and is provided with a display unit (plate member 120b in the document) constituting an optical system which guides video images to the spectacle lenses.

In each of the ones described in Patent Documents 1 and 2, an imaging device is held by a frame, and images taken by the imaging device are displayed on a display unit(s).

RELATED ART DOCUMENTS

Patent Documents

Patent Document 1: Japanese Patent Application Publication No. 2011-02753
Patent Document 2: Japanese Patent Application Publication No. 2005-284023

SUMMARY OF THE INVENTION

Problems to be Solved by the Invention

The above-described eyeglass type head-mounted displays can be expected to be used and to spread as wearable computers.

Then, there is demanded one having high processing capacity in multiple functions such as imaging, wireless communications, image recognition, sound recognition and position detection and also having excellent versatility, visibility, compactness, wearability, operability and the like. For that, in addition to the above transmissive display as an image display monitor of a computer, various pieces of hardware such as a CPU (Central Processing Unit), memories, a wireless communication device, an imaging device, a microphone and various sensors need to be disposed.

However, in Patent Documents 1 and 2, use as a multifunctional wearable computer is not expected, and hence Patent Documents 1 and 2 do not detail how pieces of hardware including devices and circuit substrates to realize various functions are disposed without reduction in visibility, compactness, wearability and the like.

In the case of the head-mounted display described in Patent Document 1, the head-mounted display itself is the eyeglass type and is not expected to be used together with eyeglasses, sunglasses, goggles or the like. Hence, the head-mounted display is difficult to be used together with eyeglasses, sunglasses or goggles and therefore lacks versatility to eyeglass wearers having some problems in eyesight, such as near sight, far sight and astigmatism, and scenes which require sunglasses or goggles and accordingly cannot be expected to widely spread. Further, the head-mounted display easily blocks the field of view of a user because the image forming devices are disposed on the sides of the display.

In the case of the head-mounted display described in Patent Document 2, the optical system which guides the displayed video images to the eyes is formed in a spectacle lens, so that the spectacle lens is a dedicated product. Hence, it is difficult to use spectacle lenses, sunglasses and eye shields in each of which such an optical system is not formed, and therefore the head-mounted display lacks versatility and accordingly may prevent itself from widely spreading.

The present invention has conceived in view of the above problems of the conventional techniques, and an object thereof is to provide a wearable computer in which pieces of hardware constituting the computer are easily disposed and which has excellent versatility and the like, the wearable computer being worn like eyeglasses.

Means for Solving the Problems

In order to achieve the above object, the invention of claim 1 is a wearable computer including: a computer; a transmissive display as an image display monitor of the computer; a casing which houses the computer; a pair of temples which are respectively connected to ends of the casing in a longitudinal direction; and a holding member which extends downward from the casing and holds a nose pad and a translucent member, such as a spectacle lens, facing an eye of a wearer, wherein a transmissive display unit of the transmissive display extends downward from the casing and to outside of an installation space of the translucent member so as to face one of a right eye and a left eye of the wearer, and the wearable computer is wearable with the casing being held above the eye of the wearer by the temples and the nose pad.

The invention of claim 2 is the wearable computer according to claim 1, wherein the holding member is fixed to the casing so as to be detachable.

The invention of claim 3 is the wearable computer according to claim 1 or 2, wherein the translucent member faces both of the eyes of the wearer.

The invention of claim 4 is the wearable computer according to claim 3, wherein apart of the translucent member, the part facing the one of the eyes of the wearer, has a size larger than a size of the one of the eyes of the wearer.

The invention of claim 5 is the wearable computer according to any one of claims 1 to 4 further including a position adjustment mechanism which adjusts a relative position of the display unit and the nose pad.

The invention of claim 6 is the wearable computer according to any one of claims 1 to 5, wherein a lower end part of the casing has a round-shaped outer wall part which curves around an axis in the longitudinal direction so as to be convex outward.

The invention of claim 7 is the wearable computer according to any one of claims 1 to 6, wherein the casing includes: a first part which is located on one side of a right eye side corresponding to the right eye and a left eye side corresponding to the left eye, the one side where the display unit is disposed, holds the display unit and houses at least a drive circuit for the display unit to display a video image; and a second part which is located on the other side of the sides and houses at least a CPU-mounted substrate of the computer.

The invention of claim 8 is the wearable computer according to claim 7, wherein a lower end of the first part is disposed higher than a lower end of the second part.

The invention of claim 9 is the wearable computer according to claim 7 or 8, wherein the first part and the second part are formed as separate elements and connected to each other through a connection member.

The invention of claim 10 is the wearable computer according to claim 9, wherein the position adjustment mechanism, which adjusts the relative position of the display unit and the nose pad, is formed at, of the connection member, a connection part to the first part.

The invention of claim 11 is the wearable computer according to any one of claims 7 to 10, wherein the casing defines a recess part at approximately a center part of the casing in the longitudinal direction, the recess part facing downward, and at least an upper end part of the holding member is disposed in the recess part.

The invention of claim 12 is the wearable computer according to claim 11, wherein an outer wall part of the second part, the outer wall part defining a side from an upper vertex to one lower end of the recess part, is formed in a staircase shape or a slope shape.

The invention of claim 13 is the wearable computer according to claim 12, wherein the upper vertex of the recess part is located toward the one side where the display unit is disposed from a center, and the second part is formed to be longer than the first part.

The invention of claim 14 is the wearable computer according to any one of claims 11 to 13, wherein the CPU-mounted substrate has an end part disposed in the second part right above the recess part and is disposed with the end part as an upper end part so as to incline with respect to the longitudinal direction.

The invention of claim 15 is the wearable computer according to claim 14, wherein a lower end part of the second part has a round-shaped outer wall part which curves around an axis in the longitudinal direction so as to be convex outward, and a lower end part of the CPU-mounted substrate is formed in a boat shape so as to be fit for an inner round surface of the round-shaped outer wall part.

The invention of claim 16 is the wearable computer according to claim 14 or 15, wherein the second part has one or more other circuit substrates, each of which is electrically connected to the CPU-mounted circuit.

The invention of claim 17 is the wearable computer according to claim 16, wherein the CPU-mounted substrate and the other circuit substrates are connected to each other through a connector mounted on the CPU-mounted substrate.

The invention of claim 18 is the wearable computer according to claim 16 or 17, wherein as the other circuit substrate, a wireless communication substrate on which a wireless communication device is mounted is provided, the wireless communication substrate extends in the longitudinal direction, end parts of the wireless communication substrate in the longitudinal direction are separately disposed as a close end part which is close to the CPU-mounted substrate and a far end part which is far from the CPU-mounted substrate, and an antenna of the wireless communication device is disposed toward the far end part.

The invention of claim 19 is the wearable computer according to any one of claims 7 to 18, wherein the first part houses an optical system to display the video image on the display unit.

Advantageous Effects of the Invention

The present invention has the following advantageous effects: a casing for a computer serves as an eyeglass frame to connect temples; sufficient visibility is secured for a wearer; a sufficient installation space is obtained in the long casing spread over a space between the temples; pieces of hardware constituting the computer are easily disposed; translucent members such as spectacle lenses can be freely chosen and whether or not to set the translucent members can be decided depending on eyesight of the wearer or usage scenes; and versatility is excellent.

EMBODIMENTS FOR CARRYING OUT THE INVENTION

Figure 1:
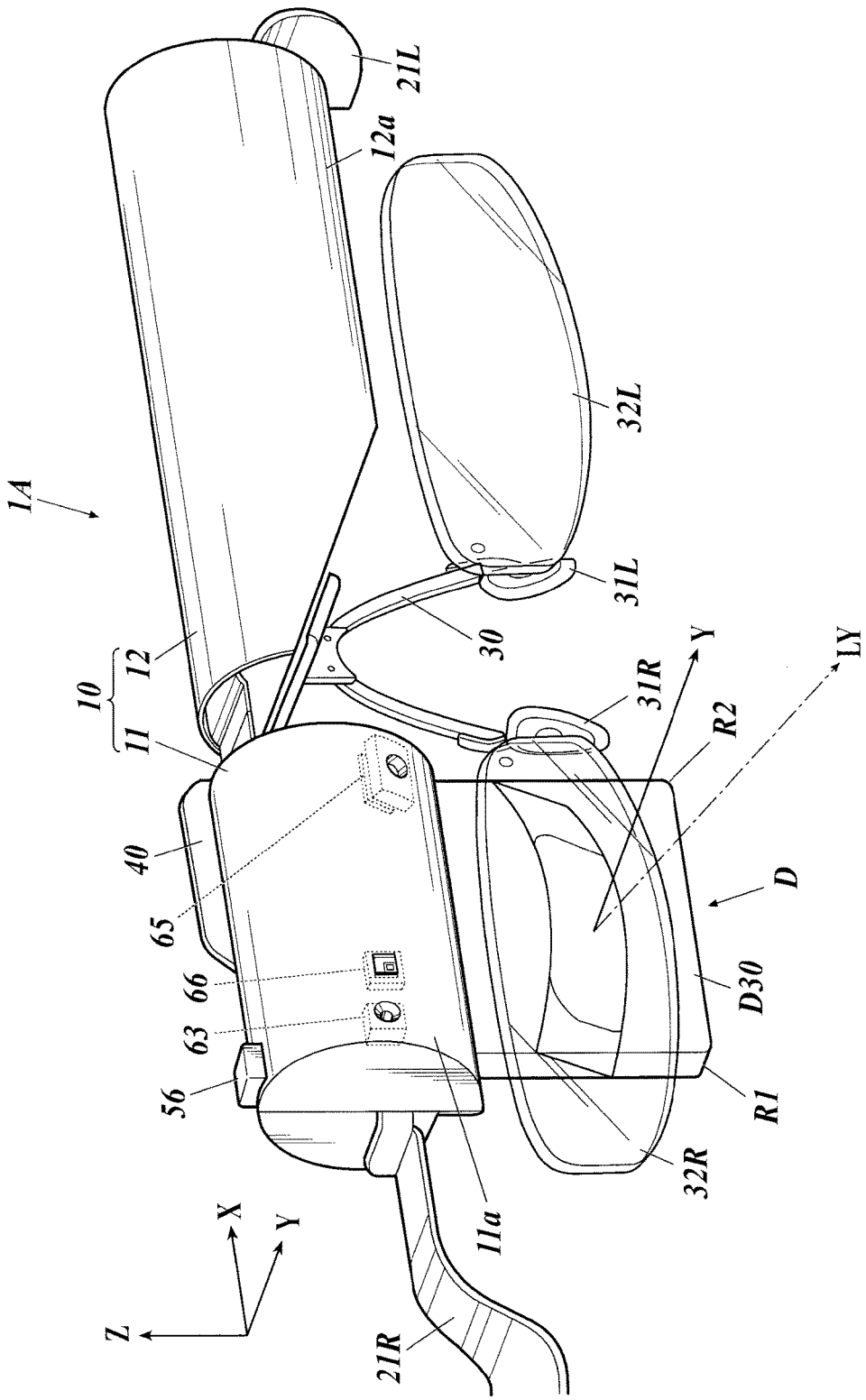
FIG. 1 is a perspective view of the main part of a wearable computer according to a first embodiment of the present invention.

Hereinafter, embodiments of the present invention are described with reference to the drawings. The following is regarding the embodiments of the present invention. The present invention is not limited thereto.

First Embodiment

First, a wearable computer according to a first embodiment of the present invention is described with reference to FIG. 1 to FIG. 8.

As shown in FIG. 1 to FIG. 5, a wearable computer 1A of the embodiment is based on a head-mounted display including a transmissive display D and worn like eyeglasses, and includes: a casing 10 (a first part 11 and a second part 12); a pair of a left temple 21L and a right temple 21R; and a holding member 30 to hold a pair of a left nose pad 31L and a right nose pad 31R and translucent members 32L and 32R such as spectacle lenses, and is wearable like eyeglasses.

The transmissive display D has an ocular optical system D30 as a transmissive display (see-through) display unit and is used as an image display monitor of a computer. In the wearable computer 1A of the embodiment, the ocular optical system 30 is disposed to face the right eye but may be disposed to face the left eye.

The casing 10 houses and holds devices, such as a CPU, a memory and various input/output devices, which constitute the computer, and also is a frame member to hold temples of eyeglasses and is formed long to be about the width of the face of a person. Because the casing 10 doubles as the frame member of eyeglasses, a separate frame member is unnecessary to provide, so that the configuration is simplified. Further, the casing 10 does not unevenly exist, either to the left or to the right, and extends from the left eye side to the right eye side. Hence, even when the transmissive display D is disposed on one eye side, a design to increase degree of balance between weight on the right and weight on the left is easy to produce.

The temples 21L and 21R are connected to the respective ends of the casing 10 in the longitudinal direction, and the holding member 30 is fixed to the center part of the casing 10, whereby the form of eyeglasses is made. The longitudinal direction (width direction) of the casing 10 is shown as an X axis, the front-rear direction thereof is shown as a Y axis, and the height direction thereof is shown as a Z axis in the drawings.

Figure 2:
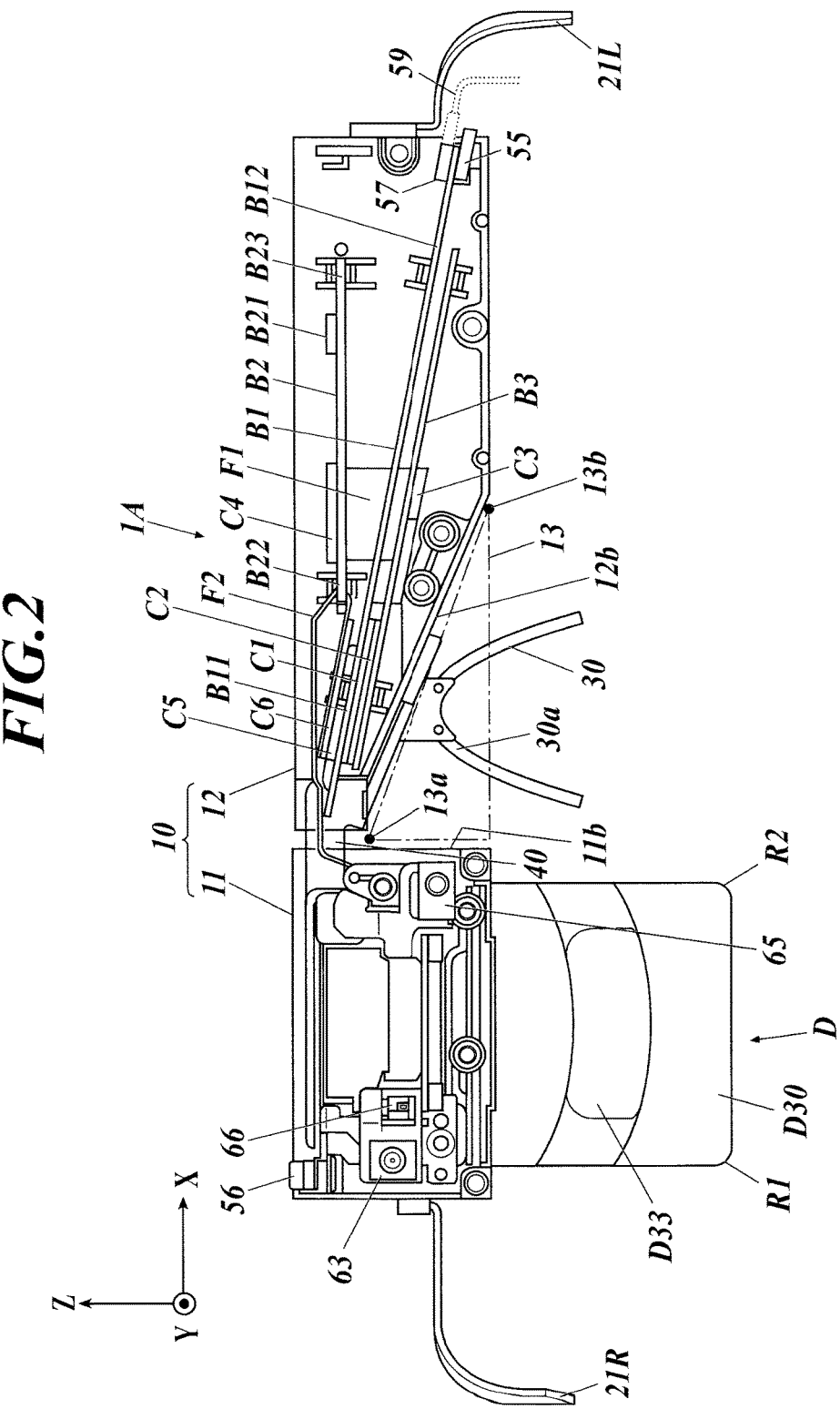
FIG. 2 is a transparent view of the main part of the wearable computer from the front according to the first embodiment of the present invention.
Figure 3:
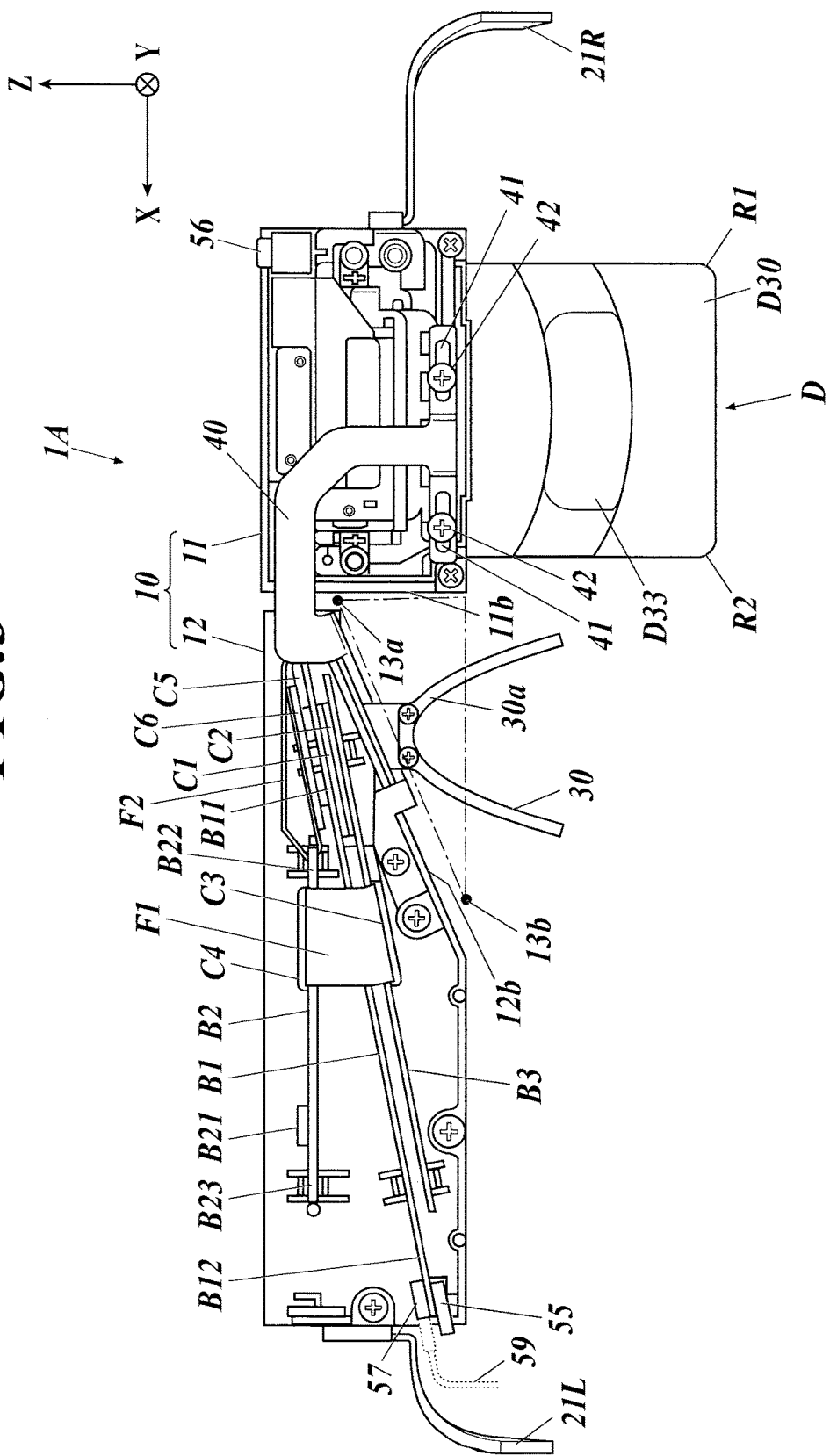
FIG. 3 is a transparent view of the main part of the wearable computer from the rear according to the first embodiment of the present invention.

The temples 21L and 21R and the casing 10 may be connected to each other through hinges as with regular eyeglasses or may take the form of hingeless eyeglasses. The forms of end pieces, tips and the like are optionally decided. In FIG. 2 and FIG. 3, the nose pads 31L and 31R and the translucent members 32L and 32R are not shown.

The holding member 30 extends downward from the casing 10 and holds the nose pads 31L and 31R and the translucent members 32L and 32R. The translucent members 32L and 32R face the eyes of a wearer and are freely selectable from various materials having various characteristics, such as, in addition to spectacle lenses, sunglasses, eye shields to protect eyes from foreign substances and specific-wavelength light removing glasses to cut off blue light emitted from a display. These may be prescription ones or non-prescription ones. A translucent member is desired to be larger than an eye of a user. More specifically, in order to have a size equal to or larger than the size of a hole of the skull of a human, the hole corresponding to an eye part, a part facing one eye is desired to be a width of 35 mm or more and a height of 30 mm or more. This size contributes to more certainly protecting an eye of a user from foreign substances in case an accident or the like happens.

The wearable computer 1A of the embodiment has the translucent members 32L and 32R facing both of the eyes of a wearer. However, the wearable computer 1A may be worn and used by a wearer with naked eyes or a wearer with contact lens without the translucent members 32L and 32R attached to the holding member 30 or may be used with one of the translucent members 32L and 32R disposed on one eye side.

The ocular optical system D30 extends downward from the casing 10 and to the outside of an installation space of the translucent members 32L and 32R (opposite side of the installation space of the translucent members 32L and 32R from a wearer) so as to face the right eye or the left eye of a wearer. In the embodiment, the ocular optical system D30 is disposed on the right eye side. A wearer observes, through the translucent member 32R, video images from the ocular optical system D30. Hence, a wearer can observe displayed video images by adjusting his/her eyesight, such as far sight, with the translucent member 32R. Thus, the wearable computer 1A can be widely used regardless of eyesight. The installation space of the translucent members 32L and 32R is defined by the holding member 30, and the ocular optical system D30 is disposed outside thereof, so that the translucent members 32L and 32R can be freely attached/detached.

Because the translucent members 32L and 32R and the ocular optical system D30 are separate elements, designing the ocular optical system D30 according to eyesight of a user is unnecessary, and versatility of the ocular optical system D30 increases.

In the embodiment, the holding member 30 is fixed to the casing 10 so as to be detachable. In the drawings, as a configuration to fix the holding member 30 to the casing 10 so as to be detachable, a configuration to fix the holding member 30 thereto with screws is shown. Alternatively, a more easily detachable mechanism, for example, with clips or with elastic pawls and releasing buttons thereof, can be used. The detachable holding member 30 allows itself to be detached together with the translucent members 32L and 32R. Consequently, a work to attach or detach the translucent members 32L and 32R to or from the holding member 30 can be easily performed, and also various types of glass units each constituted of the holding member 30, the nose pads 31L and 31R and the translucent members 32L and 32R can be easily produced, sold, and replaced by an optician or a user.

When a person wears the wearable computer 1A as a person wears eyeglasses, the casing 10 is held above the eyes of the wearer by the temples 21L and 21R and the nose pads 31L and 31R. Consequently, the wearer can observe forward without the casing 10 blocking it. Further, the lower end part of the casing 10 has round-shaped outer wall parts 11a and 12a each of which curves around the axis in the longitudinal direction, i.e., the "X", so as to be convex outward. Consequently, the wearer can easily secure a forward diagonally upward field of view while the capacity of the casing 10 is secured. In the drawings, the round shape is adopted in the upper end part of the casing 10 too. The upper end part may be rectangular so as to give priority to securing the capacity of the casing 10.

In the embodiment, the casing 10 is divided into parts, a first part 11 and a second part 12, and they are connected and fixed to each other through a connection member 40. That is, the first part 11 and the second part 12 are formed as separate elements, and they are connected to each other.

The first part 11 is located on the right eye side where the ocular optical system D30 as the transmissive display unit is disposed and is a part which holds the ocular optical system D30 and houses at least a drive circuit for the ocular optical system D30 to display video images. In the case of the transmissive display D of the embodiment, an illumination optical system D10 and a reflective display element D20 (shown in FIG. 8) to generate video images guided to the ocular optical system D30 and their drive circuits are housed in the first part 11. In the case where a transmissive display device such as a transmissive display EL display is disposed in front of an eye too, modules unnecessary to be exposed to the outside, such as a drive circuit for the display device, can be housed in the first part 11. Housing the drive circuit(s) for the display D in the first part 11 of the casing 10, the first part 11 being above the display D, allows a wide field of view of a user to be secured and prevents visibility from decreasing.

The second part 12 is located on the left eye side and is a part which houses at least a CPU-mounted substrate B1 of the computer.

At a connection part of the connection member 40 to the first part 11, a position adjustment mechanism which adjusts a relative position of the ocular optical system D30 and the nose pads 31L and 31R is formed. As shown in FIG. 3, in the embodiment, the position adjustment mechanism is realized by the connection member 40 being fixed to the first part 11 by screws 42 inserted in long holes 41 which are long in the X direction. The long holes 41 are formed at one end part of the connection member 40. The other end part of the connection member 40 is fixed to the second part 12.

The ocular optical system D30 is fixed to the first part 11, and the nose pads 31L and 31R are fixed to the connection member 40 through the holding member 30. Hence, adjustment of a relative position of the connection member 40 and the first part 11 in the X direction by loosening the screws 42 can adjust the relative position of the ocular optical system D30 and the nose pads 31L and 31R in the X direction. Consequently, the display unit (ocular optical system D30) can be disposed at an optimum position in the right-left direction for a wearer.

Further, there may be additionally and selectively provided an adjustment mechanism which adjusts a relative position of the temple 21R and the first part 11 in the X direction at a connection part of these, an adjustment mechanism which adjusts a relative position of the temple 21L and the second part 12 in the X direction at a connection part of these, and an adjustment mechanism which adjusts a relative position of the holding member 30 and the connection member 40 in the X direction and/or the Z direction at a connection part of these. The provided adjustment mechanism which adjusts the relative position of the holding member 30 and the connection member 40 at the connection part of these can adjust the position of the display unit (ocular optical system D30) in height to the nose pads 31L and 31R. Consequently, the display unit (ocular optical system D30) can be disposed at an optimum position in the up-down direction for a wearer.

Further, the holding member 30 may be directly fixed to the second part 12.

For adjustment of the position of the ocular optical system D30, the ocular optical system D30 and the first part 11 of the casing 10 are moved together. Consequently, slippage between the first part 11 and the ocular optical system D30 caused by the movement does not occur and therefore does not affect the optical systems of the transmissive display D. The ocular optical system D30 and the first part 11 of the casing 10 are integrated, so that it is easy to increase dust resistance and waterproof property of the transmissive display D.

As shown in FIG. 2 and FIG. 3, the casing 10 defines a recess part 13 at approximately the center part in the longitudinal direction (X direction), the recess part 13 facing downward, and at least the upper end part 30*a* of the holding member 30 is disposed in the recess part 13. To the holding member 30, the nose pads 31L and 31R are fixed. The holding member 30 itself is formed to be arched so as to avoid the nose of a wearer. The formed recess part 13 where the arched upper end part 30*a* of the holding member 30 is housed allows a large space for avoiding the nose of a wearer to be secured and allows everyone to use, and also can make the height of the entire wearable computer 1A small.

The first part 11 has an inside outer wall part 11*b* which defines the recess part 13. The inside outer wall part 11*b* is disposed on the Y-Z plane. The second part 12 has an inside outer wall part 12*b* which defines the recess part 13. The inside outer wall part 12*b* inclines when viewed in the Y direction. The recess part 13 is formed to be a triangle with the upper vertex 13*a* located toward the first part 11 side (right eye side). That is, the outer wall part 12*b* of the second part 12, the outer wall part 12*b* defining a side from the upper vertex 13*a* of the recess part 13 to one lower end 13*b* thereof, is formed in a slope shape. The outer wall part 12*b* is formed to be planar in FIG. 1 to FIG. 5. However, it may be formed in a staircase shape as with the outer wall part 12*b* of the second part 12 shown in FIG. 6A, or the slope may be continuously changed as with the outer wall part 12*b* of the second part 12 shown in FIG. 6B. In the former case, steps are formed in the second part 12 of the casing 10 and they can be used for positioning members such as a substrate. In the latter case, this is an advantage in securing the capacity of space in the second part 12 of the casing 10. In particular, in the latter case, the slope is formed to be arched as shown in FIG. 6B, which can make the height of the entire wearable computer 1A smaller.

As described above, the upper vertex 13*a* of the recess part 13 is located toward the side where the ocular optical system D30 as the display unit is disposed from the center, and because of this location toward the side, the second part 12 is formed to be longer than the first part 11 in the X direction. Consequently, in the second part 12, a space where a larger circuit substrate than that in the first part 11 can be housed is formed.

In the embodiment, the CPU-mounted substrate B1 is the longest circuit substrate. As shown in FIG. 2 and FIG. 3, in the second part 12 right above the recess part 13, an end part B11 of the CPU-mounted substrate B1 is disposed. The CPU-mounted substrate B1 is disposed with the end part B11 as the upper end part so as to incline with respect to the longitudinal direction (=X direction) (around the Y axis). Thus, the relatively long CPU-mounted substrate B1 can be adopted and disposed in the casing.

Figure 4:
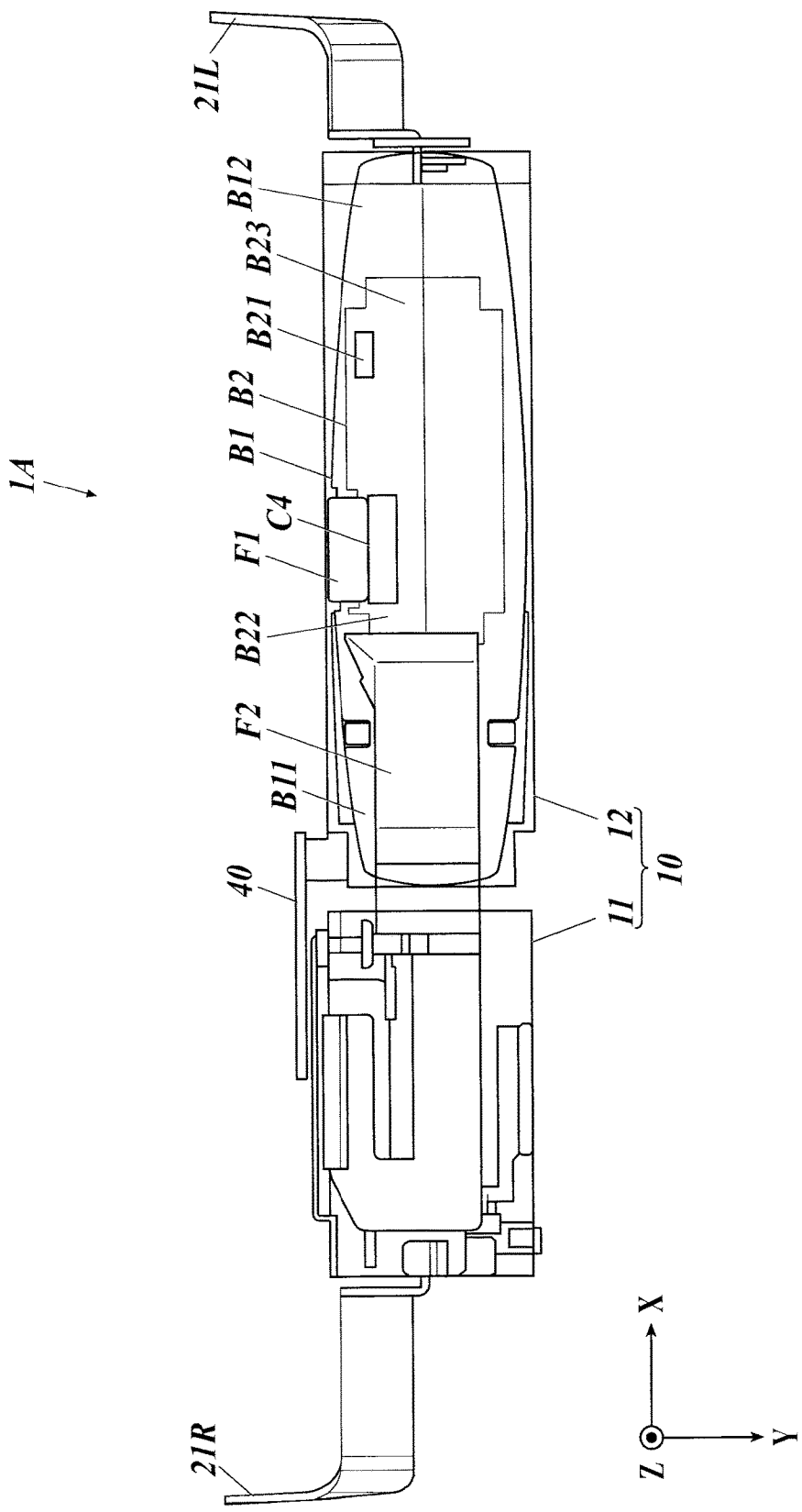
FIG. 4 is a transparent view of the main part of the wearable computer from the top according to the first embodiment of the present invention.

Further, as described above, the lower end part of the casing 10 has the round-shaped outer wall parts 11*a* and 12*a* each of which curves around the axis in the longitudinal direction, i.e., the "X", so as to be convex outward. As shown in FIG. 4, the lower end part B12 of the CPU-mounted substrate B1 is formed in a boat shape so as to fit for the inner round surface of the round-shaped outer wall part 12*a*. Consequently, the CPU-mounted substrate B1 can have a large area by utilizing, with high efficiency, the space in the second part of the casing 10. In the embodiment, the round shape is adopted in the upper end part of the casing 10 too, so that the upper end part B11 of the CPU-mounted substrate B1 is also formed in a boat shape.

Figure 7:
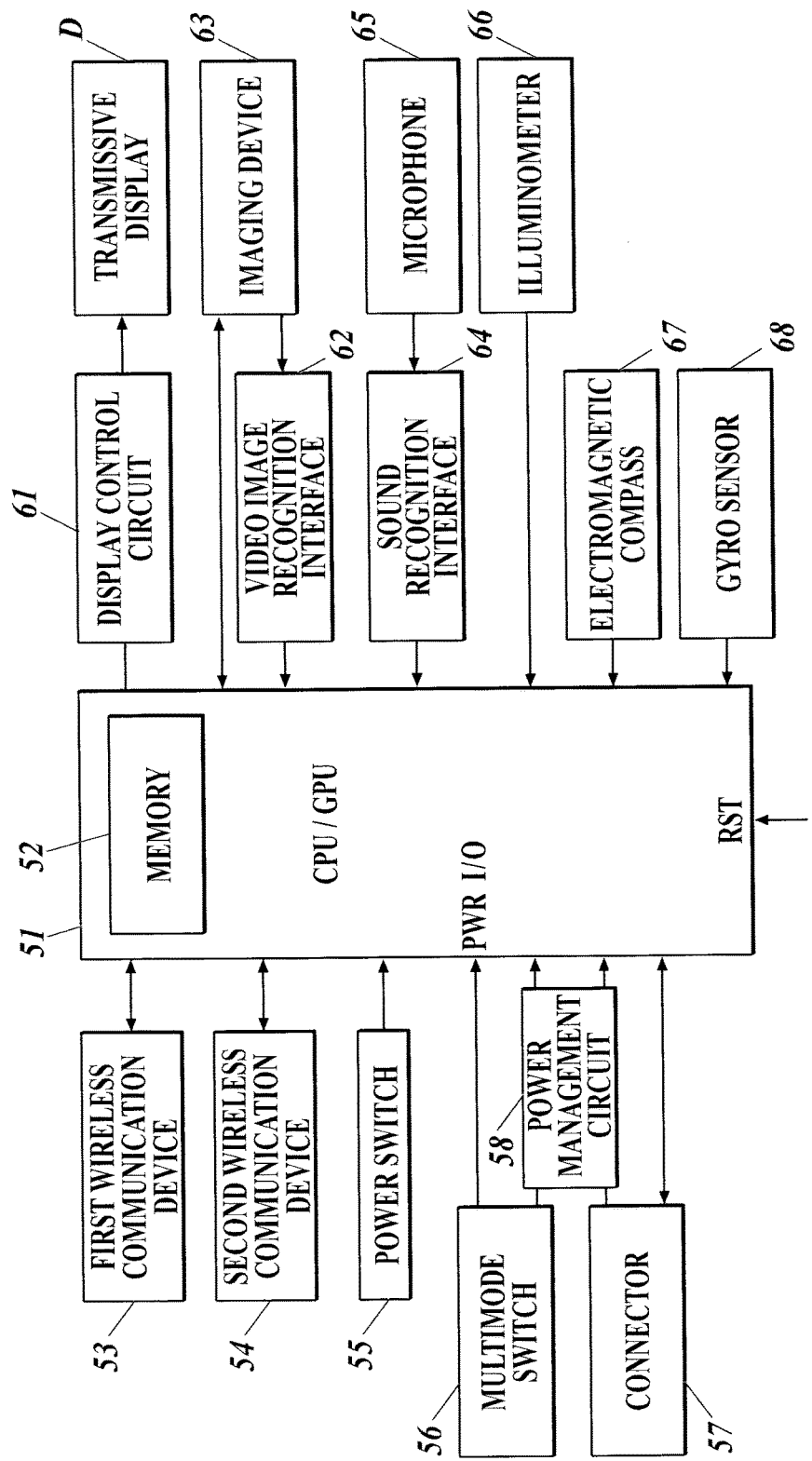
FIG. 7 is a circuit block diagram of the wearable computer according to the embodiment of the present invention.

The wearable computer 1A includes, as shown in FIG. 7, pieces of hardware such as a CPU/GPU 51 which has both a function as a central processing unit and a graphic processing unit to perform image processing, a memory 52, a first wireless communication device 53, a second wireless communication device 54, a power switch 55, a multimode switch 56, a connecter 57, a power management circuit 58, a display control circuit 61, the transmissive display D, a video image recognition interface 62, an imaging device 63, a sound recognition interface 64, a microphone 65, an illuminometer 66, an electromagnetic compass 67 and a gyro sensor 68.

For example, as the first wireless communication device 53, a wireless LAN communication module or the like for network connection is mounted, and as the second wireless communication device 54, a Bluetooth® communication module or the like for near field communications is mounted. The first wireless communication device 53 connects to a network such as Internet or an in-house LAN and directly sends/receives data to/from wireless LAN electronic devices. The second wireless communication device 54 performs near field communications with various electronic devices provided with near field communication chips. Examples of the electronic devices as communication targets include information terminals provided with wireless chips, such as mobile phones, smartphones and tablet personal computers. Video image information sent from these information terminals can be received through the wireless communication devices 53 and/or 54 so as to be displayed on the display D of the wearable computer 1A, and video image information taken by the imaging device 65 of the wearable computer 1A can be sent through the wireless communication devices 53 and/or 54 so as to be displayed on screens of the information terminals. The wearable computer 1A may be operated by operating the information terminal(s). In this case, the information terminal(s) functions as a remote controller for the wearable computer 1A. In addition to these, the examples of the electronic devices as communication targets also include various ones, such as headphones, music players, car navigation systems, digital cameras, digital video cameras, video image recording/playback devices and input devices such as pointing devices, they all being provided with wireless chips.

An IC chip which constitutes the CPU/GPU 51 is mounted on the CPU-mounted substrate B1.

IC chips which constitute the first wireless communication device 53 and the second wireless communication device 54 are mounted on a wireless communication substrate B2. On the wireless communication substrate B2, an antenna B21 for transmission and reception is mounted as shown in FIG. 2 and FIG. 3.

IC chips which constitute the memory 52 are mounted on the CPU-mounted substrate B1 and a circuit substrate B3, respectively. The CPU-mounted substrate B1 and the other circuit substrates B2 and B3 are connected to each other through a connecter C1 mounted on the CPU-mounted substrate B1. The circuit substrate B3 is disposed parallel to the CPU-mounted substrate B1 and electrically connected thereto through connectors C1 and C2. The wireless communication substrate B2 is disposed horizontally in the X direction and electrically connected to the circuit substrate B2 through a connector C3, a flexible wiring substrate F1 and a connector C4. One end of a flexible wiring substrate F2 is connected to the CPU-mounted substrate B1 through connectors C5 and C6, and the other end of the flexible wiring substrate F2 is connected to a circuit substrate in the first part 11 by extending from the second part 12 and being pulled around into the first part 11.

The imaging device 63 and the illuminometer 66 are, as shown in FIG. 1 and FIG. 2, disposed on the front surface of the first part 11 of the casing 10 to face forward. Consequently, a front image can be taken in response to a movement of the head of a wearer, and illuminance in the area of the field of view of the wearer can be detected. The illuminance detected by the illuminometer 66 is used for brightness control on the transmissive display D, imaging control on the imaging device 63 and the like. The imaging device 63 is controlled by the CPU/GPU 51, and video image signals obtained by the imaging device 63 are transmitted to the CPU/GPU 51 through the video image recognition interface 62 disposed in the vicinity of the imaging device 63.

The microphone 65 is, as shown in FIG. 1 and FIG. 2, disposed on the front surface of the first part 11 of the casing 10 to face forward. The microphone 65 is disposed to face diagonally downward so as to be sensitive to voice of a wearer. The formed round-shaped outer wall part 11*a* which is convex outward allows the microphone 65 to be easily disposed to face diagonally downward. Sound signals obtained by the microphone are transmitted to the CPU/GPU 51 through the sound recognition interface 64 disposed in the vicinity of the microphone 65.

The multimode switch 56 is disposed at an outside end part (right end part) of the first part 11 to project from the upper surface. The multimode switch 56 is a switch to which any operation is assigned, and a relatively frequent operation, for example, an operation as a shutter button of the imaging device 63, is assigned. Hence, the multimode switch 56 is disposed at a position at which operation is easy. On the other hand, the power switch 55 is disposed on a lateral surface of an end part opposite to that where the multimode switch 56 is disposed, namely, on the outside surface (left surface) of the second part 12, so that the power switch 55 is not pressed in mistake for the multimode switch 56.

The connector 57 is mounted on the CPU-mounted substrate B1, and an outlet thereof is disposed in the outside surface (left surface) of the second part 12. To the connector 57, a cable 59 for power supply and/or communications is connected. The outlet of the connector 57 is disposed in the outside surface (left surface) of the second part 12. Consequently, the cable 59 does not hinder a wearer from wearing the computer 1A or block the field of view of the wearer or the imaging device 63, and therefore the computer 1A can be used comfortably even when the cable is connected. To the cable 59, a not-shown battery as a power source, a not-shown operation device such as a pointing device or the like is connected. The cable 59 may be connected to the battery, the operation device or the like through an USB terminal(s). The cable 59 may have a function to connect to a wired LAN in case wireless communication environment is poor.

The power switch 55 and the connector 57 are mounted at the lower end part B12 of the inclined CPU-mounted substrate B1 and therefore are disposed under the connection part of the temple 21L to the second part 12. Consequently, the placement of the power switch 55 and the connector 57 does not affect the external appearance much. In addition, the cable 59 inserted into the connector 57 does not affect the external appearance much either and can avoid interference with the temple 21L, thereby being easily pulled around, because the cable 59 extends from under the temple 21L.

In the embodiment, the electromagnetic compass 67 and the gyro sensor 68 are disposed in the first part 11 so as to detect the posture and movement of the head at a position near the display but not limited thereto. The electromagnetic compass 67 and the gyro sensor 68 may be disposed in the second part 12.

The power management circuit 58 transforms/divides a voltage supplied from the power source through the cable 59 to/into multiple types of voltages required. When the power source is a secondary battery, charge control may be performed thereon. The power management circuit 58 is disposed on the CPU-mounted substrate B1 in the second part 12.

Thus, the wearable computer 1A of the embodiment has all necessary pieces of hardware built in the casing 10 and therefore can be operated only by connecting a battery thereto through the cable 59. Consequently, the wearable computer can be operated only with a member to be put on the head when configured to put a power source on the head of a wearer, for example, by attaching a battery to the temple 21L or by providing a battery housing member to connect end parts of the temples 21L and 21R and putting a battery on the back of the head therewith.

As described above, the CPU-mounted substrate B1 is disposed to incline, and the wireless communication substrate B2 is disposed parallel to the X-Y plane. That is, the wireless communication substrate B2 extends in the longitudinal direction (=X direction) of the casing 10, and the end parts B22 and B23 of the wireless communication substrate B2 in the longitudinal direction (=X direction) are separately disposed as the close end part B22 which is close to the CPU-mounted substrate B1 and the far end part B23 which is far from the CPU-mounted substrate B1. The antenna B21 of the wireless communication device is disposed toward the far end part B23. Consequently, the distance from the substrates B1 and B3 to the antenna B21 with respect to the wireless communication substrate B2 can be large, so that the conductors existing on the substrates B1 and B3 are away from the antenna B21 and do not become obstacles for communications through the antenna B21. Therefore, excellent wireless communications can be performed. As the material for the second part 12, resin is used. When resin is used as the material for the second part 12, conductors do not exist either in an area which the antenna B21 faces or around the area and do not become obstacles for communications through the antenna B21. Therefore, excellent wireless communications can be performed.

(Details of Transmissive Display)

Next, details of the transmissive display D are described.

The transmissive display D allows a wearer to observe outside images in a see-through manner and provides the wearer with video images as virtual images by displaying the video images. The transmissive display D is configured such that the first part 11, where the below-described illumination optical system D10 (shown in FIG. 8) and reflective display element D20 (shown in FIG. 8) are housed, of the casing 10 is integrated with the ocular optical system D30. The ocular optical system D30 is in a rectangular plate shape as a whole. Hereinafter, details of the transmissive display D are described.

Figure 8:
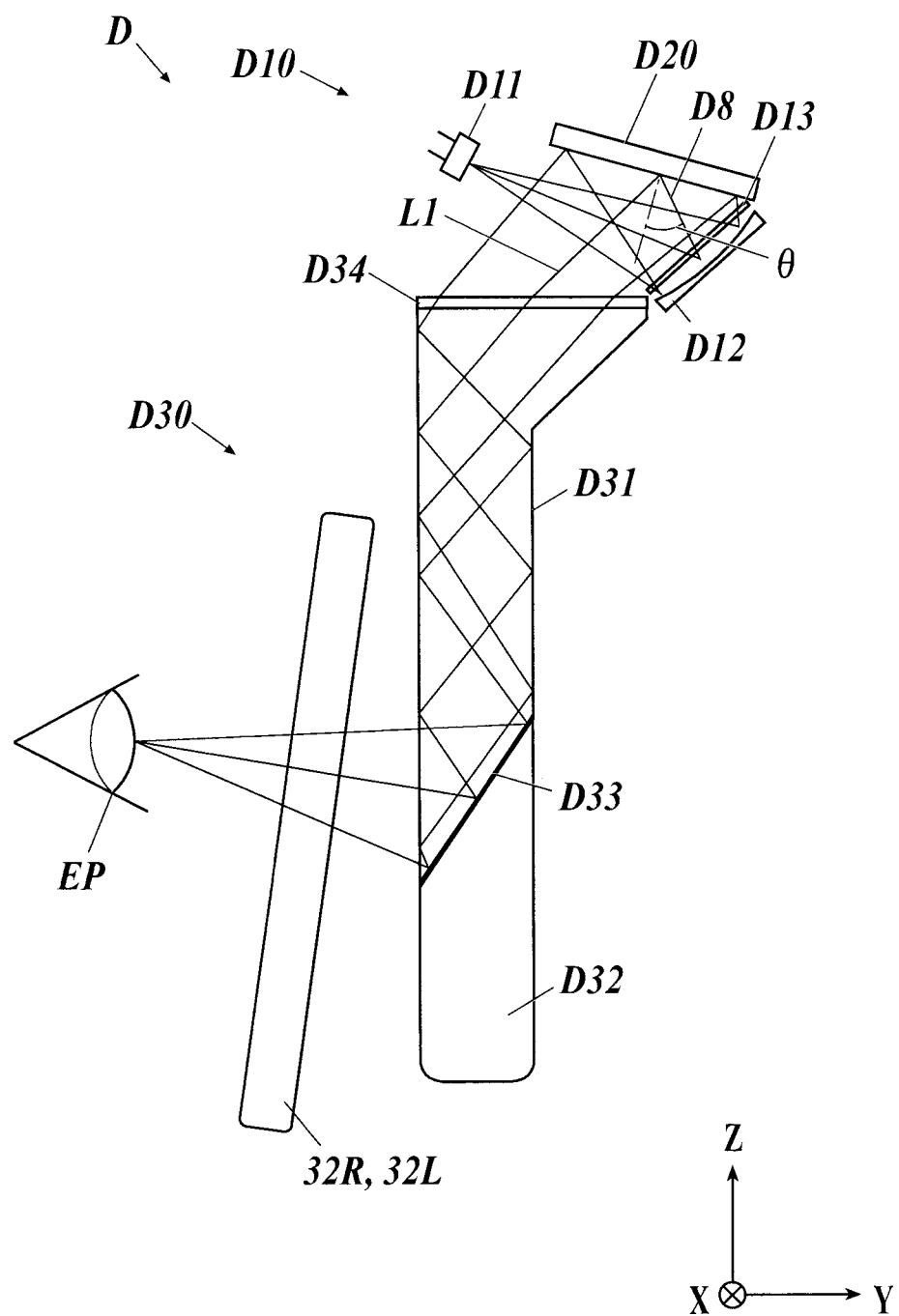
FIG. 8 is a cross-sectional view of optical systems of a transmissive display of the wearable computer according to the embodiment of the present invention.

FIG. 8 is a cross-sectional view roughly showing the configuration of the transmissive display D. The transmissive display D has the illumination optical system D10, the reflective display element D20 and the ocular optical system D30. The right-left direction (X direction) when the wearable computer 1A is worn corresponds to the long side direction of the reflective display element D20 in FIG. 8 (direction perpendicular to the paper surface of FIG. 8) and also corresponds to a direction perpendicular to a plane of incidence on which an optical axis to the below-described reflective holographic optical element D33 is incident. In the embodiment, the ocular optical system D30 is attached to the casing 10 to extend vertically downward (negative direction of the Z-axis), but may incline with respect to the XZ plane around the X axis and/or the Z axis.

Here, the optical axis means an axis which optically connects the center of a display region of the reflective display element D20 to the center of an optical pupil formed by the ocular optical system D30. The plane of incidence means a plane which contains the optical axis of incident light and the optical axis of reflected light on/by the reflective holographic optical element D33.

The illumination optical system D10 illuminates the reflective display element D20 and has a light source D11, a concave mirror D12 and a first polarizing plate D13. In the embodiment, the reflective display element D20 is used, so that the illumination optical system D10 illuminates the reflective display element D20 from the front, namely, from the side where the ocular optical system D30 is disposed.

The light source D11 emits light to the reflective display element D20 and is constituted of an RGB-integrated LED which emits light corresponding to each of three primary colors, namely, R (red) light, G (green) light and B (blue) light. The wavelength of the light emitted from the light source D11 approximately matches the wavelength of the light diffracted and reflected by the below-described reflective holographic optical element D33. The light source D11 and a pupil (optical pupil or exit pupil) EP of a wearer has an approximately conjugate positional relationship.

In the embodiment, as described below, as the reflective display element D20, a ferroelectric liquid crystal display element which can perform time division drive is used, so that the light source D11 emits the light of the three primary colors in turn by time division.

The concave mirror D12 is a reflecting mirror which reflects the light emitted from the light source D11 and guides the light to the reflective display element D20, thereby reflecting and condensing incident light on the display region of the reflective display element D20. The concave mirror D12 may be a spherical mirror or a cylindrical concave mirror.

In the embodiment, the concave mirror D12 functions as an optical path bending member which bends an optical path leading from the light source D11 to the reflective display element D20 and is disposed on the opposite side of the optical path of light travelling from the reflective display element D20 to the ocular optical system D30 from the light source D11. That is, the concave mirror D12 is disposed to interpose the optical path between the light source D11 and the concave mirror D12. The concave mirror D12 thus disposed as the optical path bending member realizes a thinner and smaller device.

The first polarizing plate D13 transmits, of the light emitted from the light source D11, light which has a predetermined polarization direction (P polarized light in the embodiment) and guides the light to the concave mirror D12, and also transmits the light the optical path of which is bent by the concave mirror D12 and which has a polarization direction the same as the above predetermined polarization direction (P polarized light in the embodiment) and guides the light to the reflective display element D20.

The incident light on the reflective display element D20 made to be P polarized light by disposition of the first polarizing plate D13 can reduce surface reflection (Fresnel loss) on the reflective display element D20 as compared with the incident light made to be S polarized light. That is, in the case of P polarized light, unlike S polarized light, an incident angle (Brewster angle) at which reflectance on the surface becomes zero exists, and therefore loss of light quantity can be reduced. Consequently, deterioration in quality of video images caused by loss of light quantity is avoidable.

Further, on the surface of the first polarizing plate D13, an antireflection process, such as attachment of an antireflection film, is performed. This can prevent the light from the light source D11 from being reflected by the surface of the first polarizing plate D13 and entering the reflective display element D20 as unnecessary light and further prevent the unnecessary light from being reflected by the surface of the reflective display element D20 and entering the ocular optical system D30. Consequently, deterioration in quality of video images caused by unnecessary light can be prevented.

The reflective display element D20 is a light modulation element having a plurality of pixels in a matrix and modulating the light emitted from the light source D11 for the respective pixels in accordance with image data so as to display video images. More specifically, the reflective display element D20 is constituted of a reflective ferroelectric liquid crystal display element in which a ferroelectric liquid crystal is interposed between two substrates, and a reflecting film (reflecting electrodes or pixel electrodes) is formed on one of the substrates.

The reflective display element D20 is disposed such that the long side direction of the rectangular display region is the right-left direction of a wearer, namely, the direction perpendicular to the paper surface of FIG. 8 (X direction), and the short side direction thereof is parallel to the paper surface of FIG. 8. The reflective ferroelectric liquid crystal display element has no color filter, so that the pixels of the reflective display element D20 are driven to be ON/OFF by time division in response to the light of the three primary colors supplied from the light source D11 in turn by time division. Thereby, color video images can be provided for a wearer.

In the reflective display element D20, semiconductors such as silicon can be used as the substrates, and therefore a small display element having a high degree of integration can be produced. In addition, switching elements (TFTs, for example) to turn ON/OFF the pixels and peripheral circuits including wiring substrates can be disposed on the substrate which is not on the display side but on the opposite side. Consequently, an aperture ratio can be easily increased, and bright video images can be displayed.

The ferroelectric liquid crystal display element has an advantage of a high drive speed, so that the reflective display element D20 constituted of the reflective ferroelectric liquid crystal display element allows the above time division drive system to be adopted.

The conventional color filter system to display color video images with R light, G light and B light passing through color filters is a space division drive system to perform color display by keeping a white light source on always and disposing an R, G or B color filter at each pixel. Hence, this color display requires pixels three times as many as monochrome display. In addition, in order to block video image light of an unnecessary color, the light needs to be blocked at pixels while the light source is kept on. Complete blocking of light at pixels is difficult, so that the color filter system brings low color purity of a single color.

On the other hand, in the time division drive system, light emission parts of R, G and B are turned on in turn at the light source. Hence, for example, when a single color is displayed, the light emission parts of the other two colors are turned off. Consequently, video images having high color purity and high contrast can be displayed.

The reflective ferroelectric liquid crystal display element is more excellent than a TN (twisted Nematic) liquid crystal display element in terms of having a wider viewing angle characteristic, so that even when the incident angle of the light incident on the reflective display element D20 from the concave mirror D12 is large, video images having high contrast, high color reproducibility (wide color reproduction region) and high display quality can be provided. In addition, degree of freedom in disposition of optical elements which constitute the illumination optical system D10 increases, so that the high-performance compact illumination optical system D10 can be configured.

Of the optical path leading from the reflective display element D20 to the pupil EP through the ocular optical system D30, the axis which connects the center of the display region of the reflective display element D20 to the center of the pupil EP is defined as a reference axis L1. In the embodiment, the reflective display element D20 is disposed such that the display surface thereof inclines with respect to the reference axis L1 which is between the reflective display element D20 and the ocular optical system D30. The reflective display element D20 thus disposed can certainly separate the optical path leading from the light source D11 to the reflective display element D20 through the concave mirror D12 and the optical path leading from the reflective display element D20 to the ocular optical system D30 without interference with miniaturization of the device. More specifically, the reflective display element D20 is disposed such that the incident angle of the light reflected by the concave mirror D12 and incident on the reflective display element D20 is within a range of $10°<\theta<60°$.

The reflective display element D20 may be constituted of a phase compensation plate and a TN liquid crystal display element combined to increase the viewing angle characteristic. The reflective display element D20 may be any as long as it is a reflective display element which can perform time division drive, and hence can be constituted of, for example, a DMD (Digital Micromirror Device produced by Texas Instruments Incorporated).

The ocular optical system D30 is an optical system to guide the video image light, which is from the reflective display element D20, to the pupil EP of a wearer. The ocular optical system D30 has axially asymmetrical (rotationally asymmetrical or non-axisymmetric) positive optical power and performs excellent aberration correction on the video image light having entered inside thereof. The ocular optical system D30 has an ocular prism D31, a deflection prism D32, the reflective holographic optical element D33 and a second polarizing plate D34.

The ocular prism D31 is a first transparent substrate which totally reflects the incident light, namely, the video image light from the reflective display element D20, inside thereof so as to make the light travel to the reflective holographic optical element D33 and guides the light to the pupil of a wearer through the reflective holographic optical element D33, while transmitting natural light and guiding the light to the pupil of the wearer. The ocular prism D31 and the deflection prism D32 are made of, for example, acrylic resin. The ocular prism D31 is configured such that the lower end part of a parallel plate is thinner as being closer to the lower end, thereby being a wedge shape, and the upper end part thereof is thicker as being closer to the upper end. The ocular prism D31 and the deflection prism D32 are joined with an adhesive so as to interpose the reflective holographic optical element D33 disposed on the lower end part of the ocular prism D31.

The deflection prism D32 is constituted of a parallel plate rectangular in a planer view and is a second transparent substrate which forms an approximately parallel plate with the ocular prism D31 when pasted to the lower end part of the ocular prism D31. The joined deflection prism D32 and ocular prism D31 can prevent distortion of outside images observed by a wearer through the ocular optical system D30 from occurring.

That is, for example, if the ocular prism D31 and the deflection prism D32 are not joined, light of outside images bends when passing through the wedge-shaped lower end part of the ocular prism D31, and therefore distortion of outside images observed through the ocular prism D31 occurs. However, the joined ocular prism D31 and deflection prism D32, thereby forming the integrated approximately parallel plate, can cancel, with the deflection prism D32, bending of the light of outside images, which occurs when the light passes through the wedge-shaped lower end part of the ocular prism D31. Consequently, distortion of outside images observed in a see-through manner can be prevented from occurring.

The reflective holographic optical element D33 is a reflective volume phase holographic one which enlarges video images displayed on the reflective display element D20 and guides the video images as virtual images to an eye of a wearer and has the same function as an aspherical concave mirror having positive power. That is, the reflective holographic optical element D33 diffracts light having wavelengths corresponding to the respective three primary colors emitted from the reflective display element D20 and guides the light to the pupil of a wearer.

The half width of the diffracted wavelength of each color on the reflective holographic optical element D33 is narrower than the half width of each color of the emitted light (each wavelength of the emitted light) from the light source D11, and of the emitted light from the light source D11, only the light of around a wavelength (diffraction peak wavelength) with which diffraction efficiency on the reflective holographic optical element D33 becomes the maximum is reflected by the reflective holographic optical element D33 and guided to the pupil of a wearer.

The reflective holographic optical element D33 is formed by exposure of a holographic photosensitive material which is applied onto a substrate. The holographic photosensitive material is made of single-layer color photo polymer having sensitivity to all of the R light, G light and B light. That is, the reflective holographic optical element D33 is produced by exposing the holographic photosensitive material with laser light corresponding to each of R, G and B of the three colors at the same time so as to record interference fringes on the holographic photosensitive material, performing fixing by UV (ultraviolet rays) irradiation, and thereafter performing baking for sensitization.

The second polarizing plate D34 transmits, of the incident light, light (S polarized light in the embodiment) the polarization direction of which is at right angles with that of the light passing through the first polarizing plate D13 and guides the light to the ocular prism D31. The second polarizing plate D34 is pasted, of the ocular prism D31, to a surface on which the light from the reflective display element D20 is incident.

Next, action of the transmissive display D having the above-described configuration is described. The light source D11 of the illumination optical system D10 emits R light, G light and B light by time division. Each color light (P polarized light, for example) first passes through the first polarizing plate D13 and then is reflected by the concave mirror D12. The reflected light (P polarized light) by the concave mirror D12 passes through the first polarizing plate D13 again and then enters the reflective display element D20.

The reflective display element D20 reflects the incident light and at the time, modulates the light in accordance with respective image data of R, G and B, thereby being the polarized light (S polarized light) different from the incident light. The light is emitted from the reflective display element D20. At the time, on the reflective display element D20, video images of the respective R, G and B in accordance with the image data are displayed by time division. The emitted light (R video image light, G video image light and B video image light) from the reflective display element D20 reaches the ocular optical system D30 across the optical path which leads from the light source D11 to the concave mirror D12, passes through the second polarizing plate D34 of the ocular optical system D30 and then enters the ocular prism D31.

In the ocular prism D31, the video image light having entered therein is totally reflected multiple times by two planes facing each other of the ocular prism 31 and guided to the reflective holographic optical element D33 disposed on the lower end of the ocular prism D31. The light is reflected thereby and reaches the pupil EP. Hence, at the position of this pupil EP, a wearer can observe the enlarged virtual images of R, G and B video images displayed on the reflective display element D20 as a color video image(s).

Meanwhile, the ocular prism D31, the deflection prism D32 and the reflective holographic optical element D33 transmit almost all the light from the outside, and therefore a wearer can observe outside images in a see-through manner. The virtual images of the video images displayed on the reflective display element D20 are observed by being overlapped on the outside images.

In the transmissive display D of the embodiment, the reflective holographic optical element D33 of the ocular optical system D30 is used as a combiner which guides the video image light from the reflective display element D20 and the natural light to the pupil of a wearer at the same time, so that the wearer can observe, through the reflective holographic optical element D33, the video images provided from the reflective display element D20 and the outside images at the same time.

The reflective holographic optical element D33 has axially asymmetrical positive optical power. Hence, using such a reflective holographic optical element D33 can increase degree of freedom in disposition of the optical members which constitute the device, and can easily miniaturize the device.

In the embodiment, the optical path bending member is constituted of, as an example, the concave mirror D12, which is a reflecting mirror, but may be any as long as it has a function to bend an optical path. For example, a prism can be used therefor. Further, in the embodiment, the optical path is bent by using the reflective display element at least one time. This has an advantage of easily making the optical system compact. However, the form is not a limitation. Hence, a transmissive display element may be used instead.

Second Embodiment

Next, a second embodiment of the preset invention is described with reference to FIG. 9.

A wearable computer 1B of the embodiment is the same as the wearable computer 1A of the first embodiment in configurations including the hardware configuration shown in FIG. 7 and the details of the transmissive display described above except that the connection member 40 is removed and a casing for a computer is formed as one element.

Figure 9:
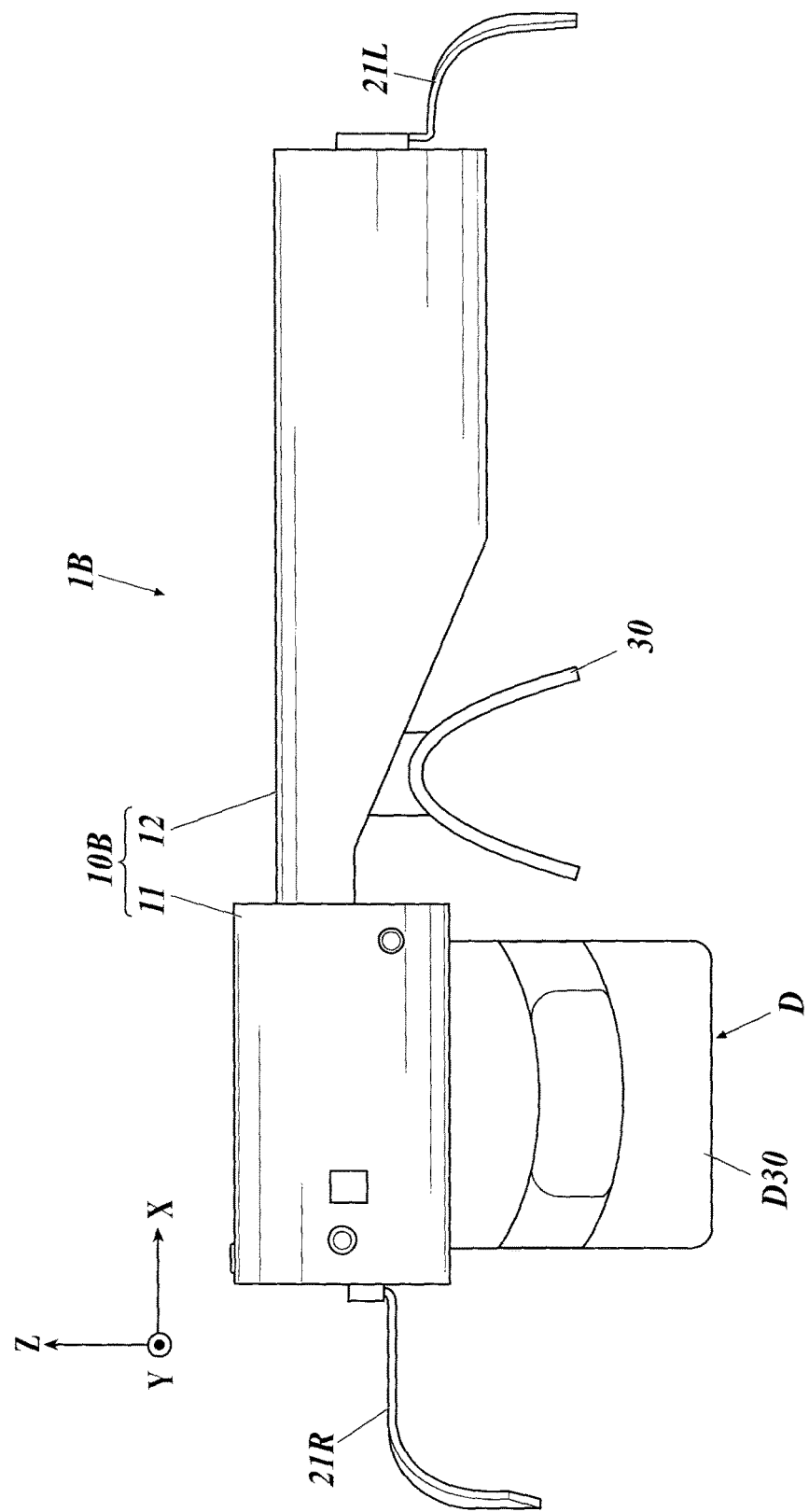
FIG. 9 is a front view of the main part of a wearable computer according to a second embodiment of the present invention.

As shown in FIG. 9, a casing 10B of this embodiment is constituted of a first part 11 and a second part 12 integrated. Because no connection member 40 is provided, a holding member 30 is directly connected to and fixed to the second part 12 not to be detachable or to be freely detachable.

In the casing 10B of the embodiment, the lower end of the first part 11 is disposed higher than the lower end of the second part 12. Under the first part 11, a display unit (ocular optical system D30) is disposed. Disposing the lower end of the first part 11 higher than the lower end of the second part 12 allows a wide field of view to be secured on the side where the display unit (ocular optical system D30) is disposed and enlarges the range of choice of positions of the display unit. For example, displayed video images can be put at a position, such as diagonally upward right of a wearer, where influence of the displayed video images on a forward field of view is relatively small. Consequently, the wearer's safety during walking or the like can be secured.

It is a matter of course that the lower end of the first part 11 being disposed higher than the lower end of the second part 12 can be realized by the casing 10 of the first embodiment which is constituted of the first part 11 and the second part 12 as separate elements.

Figure 6A:
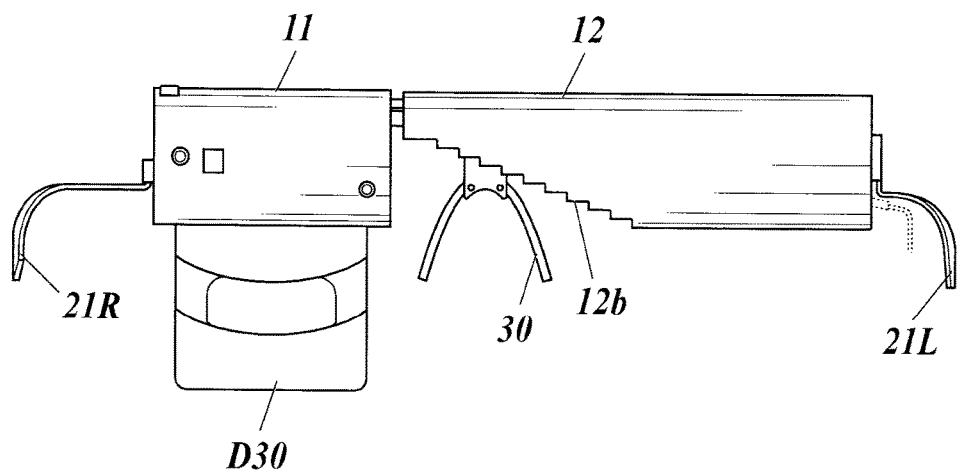
FIG. 6A is a front view of the wearable computer according to a modification on the shape of a casing and shows an example of the shape of the casing having a stepped outer wall part.

Further, the stepped outer wall part shown in FIG. 6A or the arched outer wall part shown in FIG. 6B may be applied to the integrated casing 10B.

[Others]

Other useful configurations and their effects are described.

The translucent members 32L and 32R are rimless, namely, configured as rimless eyeglasses. Making these members rimless can reduce the weight of the wearable computer as a whole. As shown in FIG. 1, an optical axis LY of each of the translucent members 32L and 32R inclines downward with respect to the Y axis and covers the field of view of a wearer.

Figure 5:
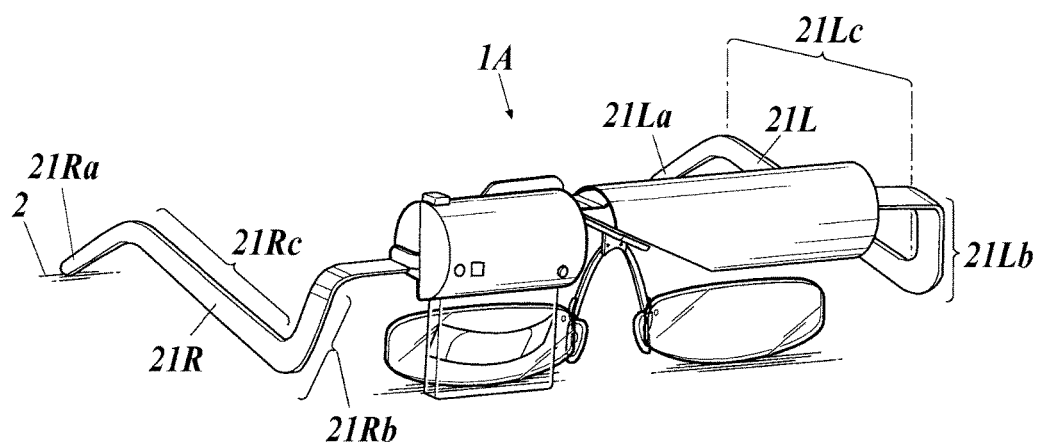
FIG. 5 is a perspective view of the wearable computer in a placement state according to the first embodiment of the present invention.
Figure 6B:
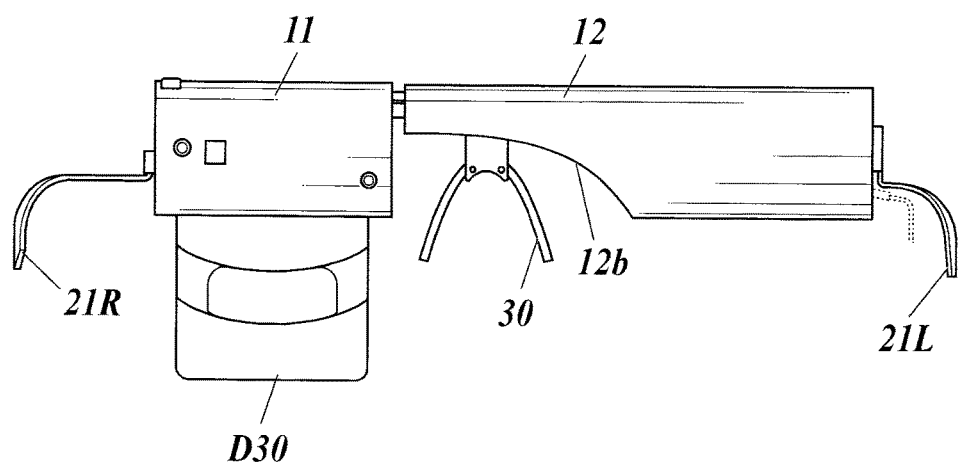
FIG. 6B is a front view of the wearable computer according to a modification on the shape of the casing and shows an example of the shape of the casing having an arched outer wall part.

As shown in FIG. 5, the wearable computer 1A (1B) can be placed on a plane such as a table in a state in which the temples 21L and 21R are open with the casing 10 up. At the time, the wearable computer 1A (1B) is stably held by the lowermost ends of the translucent members 32L and 32R and the lowermost ends of tips 21La and 21Ra touching a placement surface 2. In this placement state, the lowermost end of the display unit (ocular optical system D30) is above the placement surface 2 with a space in between so that the display unit (ocular optical system D30) does not touch the placement surface 2. Consequently, a load or damage is hardly given to the display unit in use, so that display performance and quality can be easily maintained. If the wearable computer 1A (1B) is held by the lowermost end of the display unit (ocular optical system D30) touching the placement surface 2, the wearable computer 1A (1B) is unstable because the display unit (ocular optical system D30) exists only one of the right side and the left side. The wearable computer 1A (1B) can prevent this and be placed stably.

Corner parts R1 and R2 at the lower end of the display unit (ocular optical system D30) are chamfered. This increases safety in use. To the lower end of the display unit (ocular optical system D30), a protective member such as silicone rubber may be attached.

According to the wearable computer 1A (1B), the display unit (ocular optical system D30) extends downward from the casing 10 (10B). Hence, the ocular optical system D30 can be disposed on the left eye side by configuring (i) the casing 10 with the connection member 40 or (ii) the casing 10B shown in the drawings to become a mirror image thereof. The hardware configurations of the display unit (ocular optical system D30) and the casing 10 (10B) can be shared. Thus, the right eye side display type and the left eye side display type can be produced at low costs. The second part 12 of the casing 10 of the first embodiment has the configuration which can be shared by the right eye side display type and the left eye side display type, namely, has the configuration symmetric about the X-Z plane. Hence, the wearable computer 1A of the first embodiment can further reduce costs. Further, according to the wearable computer 1A of the first embodiment, the first part 11 and the second part 12 are formed as separate elements. Hence, as described above, the position adjustment mechanism which adjusts the position of the display unit (ocular optical system D30) in the X direction can be configured, and the highly-functional wearable computer having wearability can be provided at low costs.

As shown in FIG. 5, the front end parts (end parts in the positive direction of the Y axis) 21Lb and 21Rb of the temples 21L and 21R are curved upward with respect to long parts 21Lc and 21Rc which extend rearward of the front end parts 21Lb and 21Rb, so that the connection parts (end pieces) to the first part 11 and the second part 12 are located higher than the long parts 21Lc and 21Rc. Thereby, the long parts 21Lc and 21Rc are disposed at appropriate positions in height on the sides of the head of a wearer. Consequently, while wearability is excellent, the configuration to hold the casing 10 (10B) above the eyes of the wearer to be put on the head of a wearer is realized and accordingly the field of view of the wearer is secured. That is, wearability is excellent, and hence once it is worn, the casing 10 (10B) is naturally disposed at a predetermined position above the eyes of the wearer, and also possibility of its sliding down is small, namely, holding power is excellent, and therefore comfortable use is realized.

INDUSTRIAL APPLICABILITY

The present invention can be used as a computer.

DESCRIPTION OF REFERENCE NUMERALS

1A Wearable Computer
1B Wearable Computer
10 Casing
10B Casing
11 First Part
12 Second Part
21L, 21R Temple
30 Holding Member
31L, 31R Nose Pad
32L, 32R Translucent Member
40 Connection Member
B1 CPU-mounted Substrate
B2 Wireless Communication Substrate
B21 Antenna
D Transmissive display
D10 Illumination Optical System
D11 Light Source
D12 Concave Mirror
D13 First Polarizing Plate
D20 Reflective Display Element
D30 Ocular Optical System
D31 Ocular Prism D32 Deflection Prism
D33 Reflective Holographic Optical Element
D34 Second Polarizing Plate

The invention claimed is:

1. A wearable computer comprising:
a computer;
a transmissive display as an image display monitor of the computer;
a first casing which houses a part of the transmissive display;
a second casing which is formed as a separate element from the first casing and houses the computer;
a pair of temples which are respectively connected to one end of the first casing in a longitudinal direction and, through a connection member, the other end of the first casing in the longitudinal direction; and
a holding member which extends downward from the connection member and holds a nose pad and a translucent member facing an eye of a wearer, wherein:
a transmissive display unit of the transmissive display extends downward from the first casing and to outside of an installation space of the translucent member so as to face one of a right eye and a left eye of the wearer through the translucent member,
the wearable computer further comprises a position adjustment mechanism which adjusts a relative position of the display unit and the nose pad, and
the wearable computer is wearable with the first casing being held above the one of the eyes of the wearer by the temples, the connection member and the nose pad.

2. The wearable computer according to claim 1, wherein the holding member is fixed to the connection member so as to be detachable.

3. The wearable computer according to claim 1, wherein the second casing doubles as the connection member.

4. The wearable computer according to claim 1, wherein a lower end part of the first casing has a round-shaped outer wall part which curves around an axis in the longitudinal direction so as to be convex outward.

5. The wearable computer according to claim 1, wherein a lower end of the first casing is disposed higher than a lower end of the second casing.

6. The wearable computer according to claim 1, wherein the position adjustment mechanism adjusts a position of the first casing with respect to the nose pad.

7. The wearable computer according to claim 1, wherein the first casing houses an optical system to display the video image on the display unit.

8. The wearable computer according to claim 1, wherein, when the wearable computer is placed on a plane, tips of the temples and a lowermost end of the translucent member hold the wearable computer such that a lowermost end of the display unit is apart from the plane.

9. The wearable computer according to claim 1, wherein the translucent member faces both of the eyes of the wearer.

10. The wearable computer according to claim 9, wherein a part of the translucent member, the part facing the one of the eyes of the wearer, has a size larger than a size of the one of the eyes of the wearer.

11. The wearable computer according to claim 1, wherein:
the first casing is located on one side of a right eye side corresponding to the right eye and a left eye side corresponding to the left eye, the one side where the display unit is disposed, holds the display unit and houses at least a drive circuit for the display unit to display a video image, and
the second casing is located on the other side of the sides and houses a CPU-mounted substrate of the computer.

12. The wearable computer according to claim 11, wherein:
the second casing defines a recess part at approximately a center part of the first casing and the second casing in the longitudinal direction, the recess part facing downward, and
an upper end part of the holding member is disposed in the recess part.

13. The wearable computer according to claim 12, wherein an outer wall part of the second casing, the outer wall part defining a side from an upper vertex to one lower end of the recess part, is formed in a staircase shape or a slope shape.

14. The wearable computer according to claim 13, wherein:
the upper vertex of the recess part is located toward the one side where the display unit is disposed from a center of the first casing and the second casing in the longitudinal direction, and
the second casing is formed to be longer than the first casing.

15. The wearable computer according to claim 12, wherein the CPU-mounted substrate has an end part disposed in the second casing right above the recess part and is disposed with the end part as an upper end part so as to incline with respect to the longitudinal direction.

16. The wearable computer according to claim 15, wherein:
a lower end part of the second casing has a round-shaped outer wall part which curves around an axis in the longitudinal direction so as to be convex outward, and
a lower end part of the CPU-mounted substrate is formed in a boat shape so as to be fit for an inner round surface of the round-shaped outer wall part.

17. The wearable computer according to claim 15, wherein the second casing houses one or more other circuit substrates, each of which is electrically connected to the CPU-mounted circuit.

18. The wearable computer according to claim 17, wherein the CPU-mounted substrate and the one or more other circuit substrates are connected to each other through a connector mounted on the CPU-mounted substrate.

19. The wearable computer according to claim 17, wherein:
as the other circuit substrate, a wireless communication substrate on which a wireless communication device is mounted is provided,
the wireless communication substrate extends in the longitudinal direction,
end parts of the wireless communication substrate in the longitudinal direction are separately disposed as a close end part which is close to the CPU-mounted substrate and a far end part which is far from the CPU-mounted substrate, and
an antenna of the wireless communication device is disposed toward the far end part.

* * * * *